5872X
E. Beard.
Bee Hive
No. 5,872 X.
Patented Mar. 12, 1830.
Fig: 4. NO PRINTED COPY OF SPECIFICATION IN OFFICE.
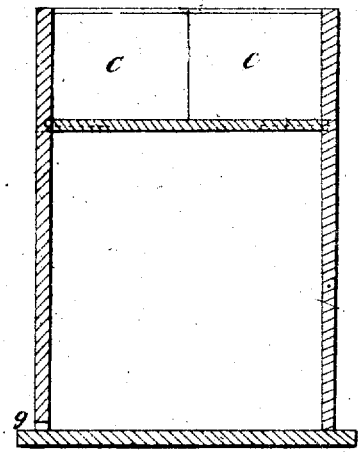
Fig: 2.
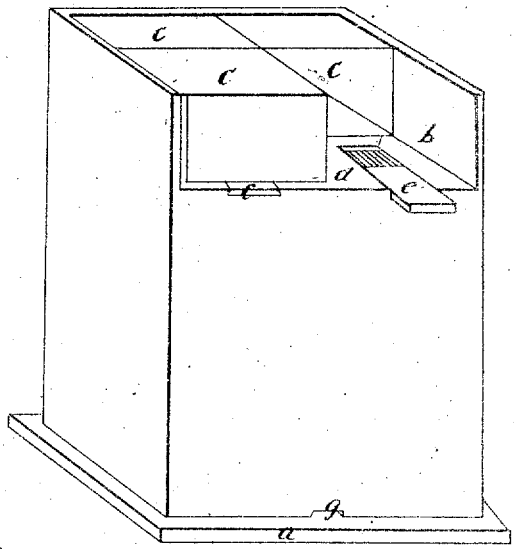
Fig: 3.
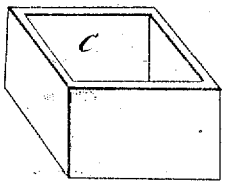
Fig: 1.
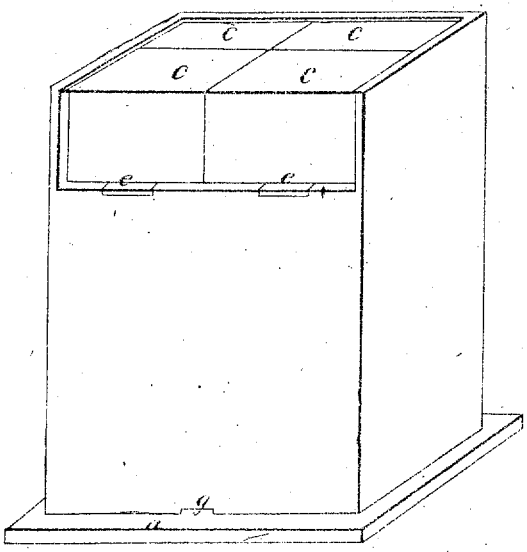

March 12 1830 5872X 187

Ebenezer Beard, Charlestown, Massachusetts

Letters Patent.

The Schedule refered to in these Letters Patent, and making part of the same, containing a description in the words of the said Ebenezer Beard himself of his improvement in the Art of making Bee Hives, called the Slide Bee Hive.—

To all persons to whom these presents shall come. Ebenezer Beard of the Town of Charlestown in the County of Middlesex & Commonwealth of Massachusetts, Mechanic sends greeting. Be it known that I the said Ebenezer Beard, have invented, constructed, made & applied to use a new & useful improvement in the art of making Bee Hives, called the Slide Bee Hive and specified in my own words, viz. The improvement of my said invention consists in the construction, application & usefullness of the slides for admitting the bees into, or excluding them from the upper boxes, or departments at pleasure, I use one or more of these slides as may be most convenient. They are fitted into crevices made in the ceiling of the lower hive.— To illustrate the use of my slides more fully it is necessary to give a description of the whole hive to which they are applied. Nothing need to be said of the size of the hive, only that it be in proportion to the swarm of bees, which inhabits it. The bottom of the hive should be square & its height about one third part greater than its width, or length, for the purpose of making a chamber in the upper part. In this chamber are fitted a number of smaller hives, or boxes which can be taken out at pleasure. they are open at the bottom so that the bees may enter them by crawling thro the crevices in the ceiling Drawing made from the specification ceiling on which the boxes stand, which they readily do and seem to delight to commence their work there, when they have filled a box with fresh comb & honey it may be taken away without destroying or injuring any of the workmen, by first shoving in a slide which closes the crevice thro' the ceiling, & prevents any more bees from entering. Let it remain in this state a few hours & the bees in the box will become tame & harmless, in consequence of being shut out from their queen. The box may be then removed by lifting it out of the chamber & setting it by inverted, the bees will all crawl out & fly back to the lower hive, & leave the honey in a most beautiful condition. The box may then be emptied and replaced to be filled again.— Draw out the slide & the bees will enter and work as before.

In Testimony that the above is a true specification of my said improvement I have hereunto set my hand & seal this nineteenth day of January in the year of our Lord, one thousand eight hundred & thirty.

Witnesses

John [illegible]
Augustus Peabody

Ebenezer Beard

End
[illegible]

[illegible]